United States Patent
Totino et al.

(10) Patent No.: US 6,702,177 B2
(45) Date of Patent: Mar. 9, 2004

(54) MANUFACTURING PROCESS FOR A PLATED PRODUCT COMPRISING A SUPPORT PART IN STEEL AND AN ANTICORROSION METALLIC COATING

(75) Inventors: Ernest Totino, Ruffine (FR); Christian Hug, Les Metz (FR)

(73) Assignee: Le Carbone Lorraine (FR)

( * ) Notice: Subject to any disclaimer, the term of this patent is extended or adjusted under 35 U.S.C. 154(b) by 0 days.

(21) Appl. No.: 10/024,009

(22) Filed: Dec. 21, 2001

(65) Prior Publication Data

US 2002/0079355 A1 Jun. 27, 2002

Related U.S. Application Data

(60) Provisional application No. 60/261,814, filed on Jan. 17, 2001.

(51) Int. Cl.[7] .................................................. B23K 1/00
(52) U.S. Cl. .................... 228/252; 228/194; 228/246; 228/219; 228/221
(58) Field of Search ................... 228/252, 194, 228/245, 246, 254, 218, 219, 220, 221; 428/655, 642, 681, 685

(56) References Cited

U.S. PATENT DOCUMENTS

| | | | |
|---|---|---|---|
| 2,604,395 A | | 7/1952 | Gonser et al. |
| 2,713,196 A | * | 7/1955 | Brown ........................ 428/674 |
| 3,784,403 A | | 1/1974 | Glaski |
| 3,854,891 A | * | 12/1974 | Chivinsky ................... 428/660 |
| 3,890,110 A | | 6/1975 | Glaski |
| 3,986,243 A | | 10/1976 | Schussler et al. |
| 4,030,848 A | | 6/1977 | Keifert et al. |
| 4,030,849 A | | 6/1977 | Keifert et al. |
| 4,073,427 A | | 2/1978 | Keifert et al. |
| 4,117,201 A | | 9/1978 | Keifert |
| 4,140,172 A | | 2/1979 | Corsey |
| 4,291,104 A | * | 9/1981 | Keifert ........................ 428/594 |
| 4,444,353 A | * | 4/1984 | McMurray et al. ......... 228/231 |
| 4,703,884 A | * | 11/1987 | Landingham et al. .... 228/124.5 |
| 4,818,629 A | | 4/1989 | Jenstrom et al. |
| 5,222,652 A | * | 6/1993 | Gibbs et al. ................. 228/143 |
| 5,383,985 A | * | 1/1995 | Coulon ........................ 148/527 |
| 6,413,651 B1 | * | 7/2002 | Yan et al. .................... 428/592 |

FOREIGN PATENT DOCUMENTS

| | | |
|---|---|---|
| FR | 2414975 | 8/1979 |
| FR | 2690860 | 11/1993 |

OTHER PUBLICATIONS

International Search Report, dated Sep. 2001, No. FA 596484 & FR 0016897, pps. 1–2.

Braun et al., "Vakuumlöten, ein Fügeverfahren mit Vorteilen", Technische Rundschau, 1988, vol. 80, No. 42, pps. 60–61.

Bauer, "Löten und Härten von Bauteilen und Werkzeugen in Vakuumanlagen", Härterei–Technisch Mitteilungen, 1981, vol. 36, No. 2, pps. 81–85.

Boughton et al., "Furnace Brazing–2: A Survey of Modern Processes and Plant", Welding And Metal Fabriacation, 1973, No. XP002176571, pps. 120–138.

* cited by examiner

Primary Examiner—M. Alexandra Elve
Assistant Examiner—Kevin L McHenry
(74) Attorney, Agent, or Firm—Connolly Bove Lodge & Hutz LLP

(57) ABSTRACT

The aim of the present invention is a process for manufacturing a plated product (1) comprising a support part in steel (2) and an anticorrosion metallic coating (3), characterized in that the anticorrosion coating (3) is fixed on the support part (2) by controlled-atmosphere brazing, in particular by vacuum brazing. The process according to the invention makes it possible to fix solidly an anticorrosion coating with a thickness smaller than 1 mm on a steel plate.

27 Claims, 2 Drawing Sheets

MANUFACTURING PROCESS FOR A PLATED PRODUCT COMPRISING A SUPPORT PART IN STEEL AND AN ANTICORROSION METALLIC COATING

This application claims the benefit of Provisional application Ser. No. 60/261,814, filed Jan. 17, 2001.

FIELD OF THE INVENTION

The present invention relates to devices for the handling, stocking and processing of chemical products intended for the chemical industries. In particular it concerns mixers, processing devices and routing devices capable of handling highly corrosive products, such as concentrated acids or bases. In the present application, the expression "elements of chemical devices" means in particular, and in a collective manner, storage chambers, tanks, heat exchangers, mixers, treatment devices and routing devices.

More specifically, the invention relates to a manufacturing process for plated products comprising at least one support part in steel and an anticorrosion metallic coating, such as elements of chemical devices or assembly parts intended for manufacturing elements of chemical devices.

STATE OF THE ART

The chemical industries use numerous elements of chemical devices, which are needed for handling, stocking and/or processing highly corrosive chemical products and which, consequently, have to be capable of resisting any attack from the latter.

In order to guarantee high resistance to corrosion, the elements of the chemical device usually comprise steel support parts and a metallic anticorrosion coating with a base of so-called "noble" metals, such as titanium, tantalum, zirconium, a nickel-based alloy or stainless steel. The elements of the chemical device can be manufactured by mounting assembly parts, such as plates, previously coated with an anticorrosion metallic coating. The anticorrosion coating can be fixed to the support part in different ways, such as knurling, explosion cladding, hot rolling or simple covering without any junction between the plate and the anticorrosion coating.

Certain applications, such as devices with low internal pressure, need a strong link between the steel support part and the anticorrosion coating, that is to say a link with high resistance to stripping, in order to avoid separation which could, for example, lead to collapse of the anticorrosion coating. Knurling, explosion cladding and hot rolling make it possible to obtain very strong part/coating links, but these techniques can only be used when the thickness of the anticorrosion coating is less than 0.7 mm.

The applicant therefore looked for a method applicable to industrial development for fixing solidly a low thickness anticorrosion coating on a support part in steel.

AIM OF THE INVENTION

The aim of the invention is a process for manufacturing a plated product comprising a support part in steel and an anticorrosion metallic coating, such as an element of a chemical device or an assembly part intended to manufacture chemical device elements, characterized in that the anticorrosion coating is fixed on the support part by brazing under controlled atmosphere, such as vacuum brazing or brazing under inert gas.

The applicant noted that the process according to the invention made it possible to fix solidly on a metallic part in steel an anticorrosion coating with a thickness less than 1 mm, or even less than 0.5 mm, possibly smaller than or equal to 0.3 mm.

FIGURES

DESCRIPTION OF THE INVENTION

Figure 1:
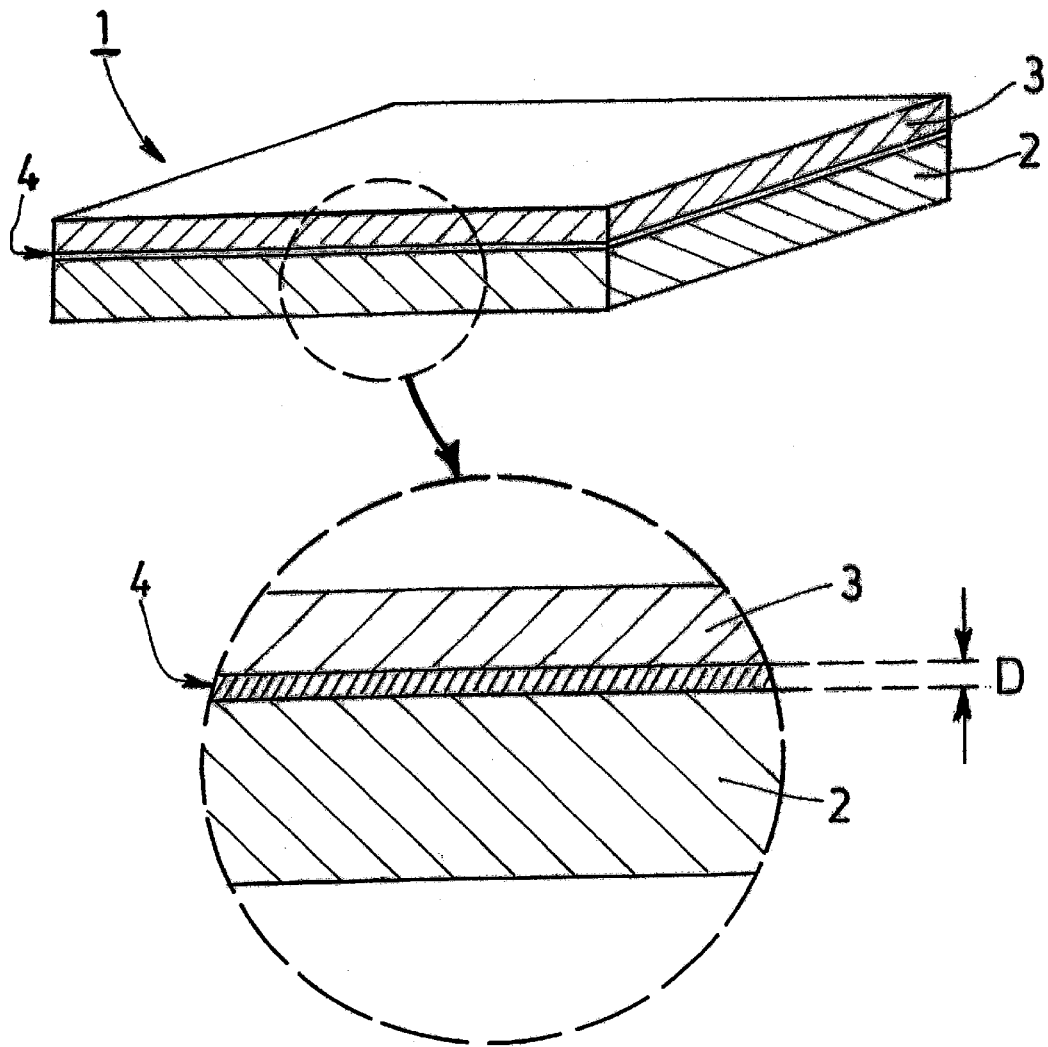
FIG. 1 shows diagrammatically a product plated according to the invention.
Figure 2:
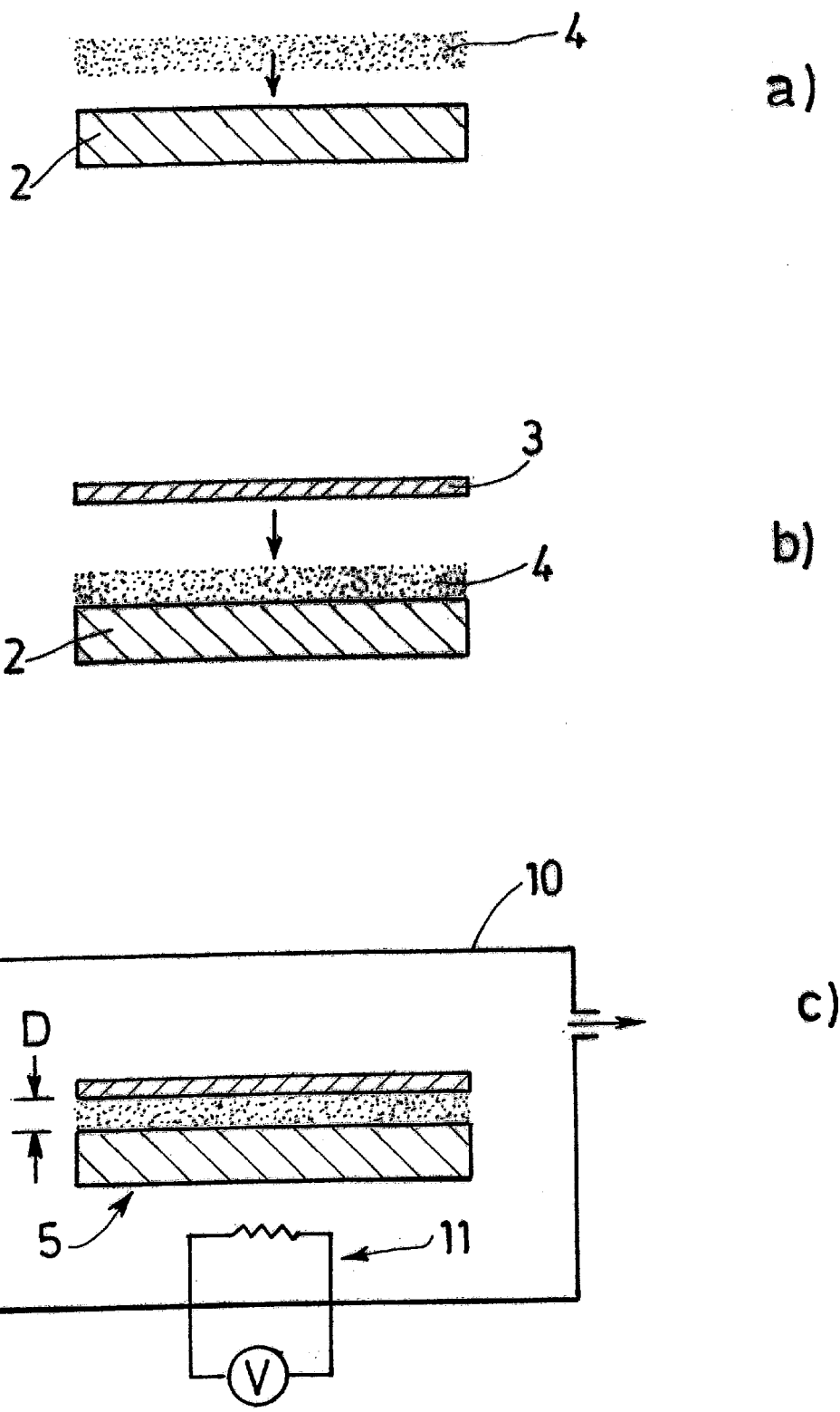
FIG. 2 shows diagrammatically an embodiment of the process according to the invention.

According to the invention, the process for manufacturing a plated product 1 comprising a support part in steel 2 and an anticorrosion metallic coating 3 is characterized in that it comprises at least one controlled-atmosphere brazing operation, using at least one brazing material 4, in such a way as to establish a mechanical link between at least one defined part of the support 2 and at least one defined part of the coating 3.

Said defined parts are called bonding surfaces. The link between the support and the coating can be established by several bonding surfaces. The bonding surface or surfaces are advantageously pre-treated, before the brazing operation, in such a way, in particular, so as to eliminate the surface oxides. For example, one can carry out at least one treatment selected from the chemical, the electrochemical, the physico-chemical and the mechanical treatments (such as chemical pickling, electrochemical pickling, machining or sanding). These treatments may be combined.

In order to enhance the strength of the bonding the process of the invention may also comprise depositing at least one layer capable of improving the tying of the brazing material. The deposition can be effected by chemical means, electrolytic means or in vapor phase (chemical vapor deposition or physical vapor deposition). Said layer is typically metallic, for example titanium or copper. The deposition may be carried out on the support part 2, the metallic coating 3 or both. The deposition is effected before the brazing operation.

The brazing operation normally comprises bringing said defined parts together in such a way as to obtain a spacing D which is preferentially chosen so as to avoid the formation of gas bubbles or bonding defects between the bonding surfaces during the brazing operation. The spacing D is typically less than 0.1 mm. The appropriate value of the spacing D can be obtained by applying a plating pressure on the support and the coating.

The controlled atmosphere may be a vacuum (at least partial) or an inert gas (such as a rare gas (typically argon or helium) or nitrogen or a mixture thereof).

The brazing under controlled atmosphere is preferably vacuum brazing. Preferably the vacuum is fairly high, that is to say that the residual pressure in the chamber is less than $10^{-4}$ mbar, and typically is comprised between $10^{-4}$ and $10^{-5}$ mbar. This embodiment makes it possible to avoid contamination of the elements of the assembly and/or possible pollution by the gas of the controlled atmosphere (which may, for example, weaken the metallic coating at the brazing temperature (typically by the action of oxygen possibly contained in the industrial inert gases)).

In the preferred embodiment of the invention, said controlled-atmosphere brazing operation comprises:
  interposing at least one brazing material 4 between the steel support part 2 and the anticorrosion coating 3, in such a way as to form an initial assembly 5;
  possibly, applying a plating pressure on said initial assembly 5;

introducing the initial assembly into a controlled-atmosphere chamber, such as a vacuum chamber, 10 provided with means of heating 11 such as a resistance;

controlling the atmosphere in the chamber 10 (and thus in proximity to said assembly), such as forming a vacuum in said chamber or replacing the atmosphere in said chamber with an inert gas;

heating of said assembly 5 up to a temperature at least equal to the brazing temperature of said brazing material 4.

The brazing temperature, typically equal to the fusion temperature of the brazing material, is such that the material melts and produces an intimate bond with the element in contact with it (steel support part and/or anticorrosion coating).

The brazing material is preferably spread uniformly between the support part and the anticorrosion coating in order to obtain a uniform bonding layer and to increase the contact surface between these two elements.

Interposing the brazing material 4 between the support part 2 and the anticorrosion coating 3 can be carried out in two stages. In particular, the interposing can comprise:

depositing the brazing material 4 on the support part 2, at the location of the so-called "bonding" surface;

positioning of the anticorrosion coating 3 on the support part 2, in such a way as to form said initial assembly 5.

In certain cases, it can be advantageous to first carry out the deposit of the brazing material 4 on the anticorrosion coating 3, level with the so-called "bonding" surface, and then to position the support part 2 on the anticorrosion coating, in such a way as to form said initial assembly 5.

Advantageously one can apply a mechanical plating pressure on said assembly before and/or during said reheating. This plating pressure is exercised so that the support part and the anticorrosion coating are tightened against each other so as to compress the brazing material.

Preferably, the anticorrosion metallic coating 3 is composed of titanium, an alloy of titanium, tantalum, and alloy of tantalum, zirconium or an alloy of zirconium.

The brazing material 4 can be a fusible alloy (typically an eutectic alloy) or a fusible metal. Said material 4 can possibly contain a flux. Advantageously the brazing material can diffuse in the element with which it is in contact, which makes it possible to ensure a very strong bonding between said elements. The brazing material is typically in the form of a powder, a sheet or a mesh. In its trials, the applicant noted that the mesh presented the advantage of compensating efficiently for any possible variation in spacing D between the bonding surfaces.

When the coating 3 is in tantalum or an alloy of tantalum, the brazing material 4 is typically composed of nickel, chromium, silicon or boron, or a mixture or an alloy thereof, such as an alloy of the BNi type containing nickel and boron (according to ASTM classification), such as Ni-14Cr-3B-4.5Si-4Fe, Ni-7Cr-3B-4.5Si-3Fe or Ni-2B-3.5Si-1.5Fe. In these cases, the brazing temperature is situated typically between 1000° and 1050° C. The brazing material 4 may also be a silver-based material (such as an alloy or a mixture) containing lithium, copper, aluminium, zinc and/or tin.

When the coating 3 is titanium or an alloy of titanium, the brazing material 4 is typically a silver-based material (such as an alloy or a mixture) containing lithium, copper, aluminium, zinc and/or tin, or an alloy with a titanium base, such as TiNi, TiZrBe, 48Ti-48Zr-4Be or 43Ti-43Zr-12Ni-2Be.

When the coating 3 is zirconium or an alloy of zirconium, the brazing material 4 is typically an alloy with a base of zirconium, copper or nickel, such as Zr-5Be, Cu-20Pd-3In, Ni-20Pd-10Si, Ni-30Ge-13Cr or Ni-6P. The brazing material 4 may also be a silver-based material (such as an alloy or a mixture) containing lithium, copper, aluminium, zinc and/or tin.

The steel support parts and the anticorrosion coatings can take the form of plates. These elements, which can be cut out beforehand, are typically flat, but they can also be rounded, half-cylindrical or another shape. The elements can also be shaped before being bonded by brazing. It is also possible to carry out a brazing on a chemical device element using anticorrosion metallic coatings with an appropriate shape.

The steel used is generally a carbon steel, and preferably a chromium steel. It is particularly advantageous to use a steel whose thermal expansion coefficient is close to that of the anticorrosion coating, that is to say that, advantageously, the difference between the thermal expansion coefficient of said steel and the expansion coefficient of the anticorrosion coating is less than 20% and preferably lower than 10%. More precisely, the thermal expansion coefficient of said steel is equal to that of said coating ±20% and preferably ±10%.

The support part 2 and/or the anticorrosion coating can be presented in the form of a plate or sheet.

Said plated product 1 can be an assembly part or a chemical device element.

EXAMPLES

Trials 1

Trials on manufacturing assembly parts were carried out by vacuum brazing using plates of carbon steel and anticorrosion coatings of tantalum. The brazing material was a BNi alloy of the ASTM classification, with a nickel base and containing boron, chromium and silicon.

The values of resistance to stripping observed during these trials were between those obtained on assembly parts produced by explosion cladding and those obtained on assembly parts produced by knurling.

The applicant noted that the depth of diffusion of the brazing material in the tantalum element was of the order of 10 to 20 µm, such that the resistance to corrosion of the tantalum coating was not affected by this diffusion.

Trials 2

Trials on manufacturing assembly parts were also carried out by vacuum brazing using plates in carbon steel and anticorrosion coatings in either tantalum or titanium. The brazing material had a silver and copper base.

Bending and punching tests (with a curvature radius varying between 30 mm and 100 mm) have shown no breaking or decoherence of the brazing bond which exhibited a low relative hardness (110 Hv). Moreover calendering of titanium plates (with dimensions 1 m×1 m) was done with a radius of curvature equal to 150 mm without degrading the quality of the bond (even at a microscopic scale).

The applicant further noticed that the diffusion depth of the brazing material 4 in the anti-corrosion coating 3 was lower than 60 µm, so that the resistance to corrosion is not affected by this diffusion.

Advantages of the Invention

The plated products obtained by the process of the invention present the advantage of high transversal thermal conductivity thanks to a close bonding between the support part and the anticorrosion coating over the greater part of the bonding surface, which is not the case, for example, with a bond obtained by knurling which only produces bonding bands. Transversal thermal conductivity is particularly advantageous in chemical devices comprising means of thermal transfer such as an exchanger or a double envelope for cooling or heating.

What is claimed is:

1. A process for manufacturing a plated product comprising a support part of steel and an anticorrosion metallic coating, said process comprising:

conducting at least one brazing operation under vacuum at a residual pressure of less than $10^{-4}$ mbar, said brazing operation being conducted with at least one brazing material under controlled atmosphere, and in such a way as to establish a mechanical bond between at least one defined part of the support and at least one defined part of the coating.

2. The manufacturing process of claim 1, wherein the brazing operation comprises bringing said defined parts closer together in such a way as to obtain a space D less than 0.1 mm.

3. The manufacturing process of claim 1, wherein said brazing operation comprises:

interposing at least one brazing material between the steel support part and the anticorrosion coating, in such a way as to form an initial assembly;

optionally, applying a plating pressure on said initial assembly;

introducing the initial assembly into a vacuum chamber provided with means of heating;

formation of a vacuum in said chamber;

heating of said assembly up to a temperature at least equal to the brazing temperature of said brazing material.

4. The manufacturing process of claim 1, wherein the brazing operation is effected under inert gas.

5. The manufacturing process of claim 4, wherein the inert gas is selected from the group comprising rare gases, nitrogen and mixtures thereof.

6. The manufacturing process of claim 4, wherein said brazing operation comprises:

interposing at least one brazing material between the steel support part and the anticorrosion coating, in such a way as to form an initial assembly;

optionally, applying a plating pressure on said initial assembly;

introducing the initial assembly into a controlled-atmosphere chamber provided with means of heating;

replacing the atmosphere in said chamber with an inert gas;

heating of said assembly up to a temperature at least equal to the brazing temperature of said brazing material.

7. The manufacturing process of claim 1, further comprising conducting at least one treatment selected from the group consisting of chemical treatments, electrochemical treatments, physico-chemical treatments, and mechanical treatments.

8. The manufacturing process of claim 1, further comprising depositing at least one layer capable of improving bonding of the brazing material.

9. The manufacturing process of claim 8, wherein said layer is metallic.

10. The manufacturing process of claim 8, wherein said depositing is effected by chemical means, electrolytic means or in vapor phase.

11. The manufacturing process of claim 1, wherein the thickness of said coating is less than 1 mm.

12. The manufacturing process of claim 1, wherein the thickness of said coating is less than 0.5 mm.

13. The manufacturing process of claim 1, wherein said coating comprises tantalum or an alloy of tantalum.

14. The manufacturing process of claim 13, wherein the brazing material is a silver-based material containing lithium, copper, aluminium, zinc and/or tin.

15. The manufacturing process of claim 1, wherein said coating comprises titanium or an alloy of titanium.

16. The manufacturing process of claim 15, wherein the brazing material is a silver-based material containing lithium, copper, aluminium, zinc and/or tin.

17. The manufacturing process of claim 1, wherein said coating comprises zirconium or an alloy of zirconium.

18. The manufacturing process of claim 17, wherein the brazing material is an alloy with a base of zirconium, copper or nickel.

19. The manufacturing process of claim 17, wherein the brazing material is a silver-based material containing lithium, copper, aluminium, zinc and/or tin.

20. The manufacturing process of claim 1, wherein the brazing material is in the form of powder, a sheet of a mesh.

21. The manufacturing process of claim 1, wherein said steel is a chromium steel.

22. The manufacturing process of claim 1, wherein the difference between the thermal expansion coefficient of said steel and the thermal expansion coefficient of said anticorrosion coating is less than 20%.

23. The manufacturing process of claim 1, wherein said support part comes in the form of a plate or sheet.

24. The manufacturing process of claim 1, wherein said coating is in the form of a plate or sheet.

25. The manufacturing process of any one of claims 1 to 24, wherein said plated product comprises an assembly part or an element of chemical device.

26. A process for manufacturing a plated product comprising a support part of steel and an anticorrosion metallic coating, said process comprising:

conducting at least one brazing operation under controlled atmosphere, utilizing at least one brazing material, in such a way as to establish a mechanical bond between at least one defined part of the support and at least one defined part of the coating, wherein said coating comprises tantalum or an alloy of tantalum and wherein the brazing material comprises nickel and boron.

27. A process for manufacturing a plated product comprising a support part of steel and an anticorrosion metallic coating, said process comprising:

conducting at least one brazing operation under controlled atmosphere, utilizing at least one brazing material, in such a way as to establish a mechanical bond between at least one defined part of the support and at least one defined part of the coating, wherein said coating comprises titanium or an alloy of titanium and wherein the brazing material is an alloy with a titanium base.

* * * * *